(12) United States Patent
Feest

(10) Patent No.: US 6,892,455 B1
(45) Date of Patent: May 17, 2005

(54) STATIONARY ROLLER SHAFT FORMED OF A MATERIAL HAVING A LOW INCLUSION CONTENT AND HIGH HARDNESS

(75) Inventor: Robert H. Feest, Fountain Hills, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/403,970

(22) Filed: Mar. 31, 2003

Related U.S. Application Data

(62) Division of application No. 09/990,007, filed on Nov. 20, 2001, now Pat. No. 6,585,483.

(51) Int. Cl.[7] ............................................... B23P 17/00
(52) U.S. Cl. ..................... 29/895.33; 29/895; 29/557; 29/895.3; 492/58
(58) Field of Search ................ 29/895, 895.33, 29/895.3; 492/58

(56) References Cited

U.S. PATENT DOCUMENTS

| | | |
|---|---|---|
| 2,599,575 A | 6/1952 | Morgan |
| 3,362,256 A | 1/1968 | Cluff et al. |
| 4,242,130 A | 12/1980 | Brandis et al. |
| 4,276,087 A | 6/1981 | Haswell et al. |
| 4,445,532 A | 5/1984 | Mitchell |
| 4,459,121 A | 7/1984 | Gazzera et al. |
| 4,484,959 A | 11/1984 | Boucher et al. |
| 4,779,413 A | 10/1988 | Mouton |
| 4,871,296 A | 10/1989 | Laessle et al. |
| 4,914,906 A | 4/1990 | Burch |
| 5,019,332 A | 5/1991 | Wegman et al. |
| 5,122,099 A | 6/1992 | Boedo et al. |
| 5,209,388 A | 5/1993 | Mittendorf et al. |
| 5,245,820 A | 9/1993 | Zalewski et al. |
| 5,267,433 A | 12/1993 | Burch |
| 5,403,545 A * | 4/1995 | Takata et al. ............... 420/112 |
| 5,419,420 A | 5/1995 | Quenneville |
| 5,522,914 A | 6/1996 | Stasko et al. |
| 5,578,773 A | 11/1996 | Wisell |
| 5,636,848 A | 6/1997 | Hager et al. |
| 5,679,908 A | 10/1997 | Pinnow et al. |
| 5,704,538 A | 1/1998 | Mittendorf |
| 5,752,383 A | 5/1998 | Rominek |
| 5,824,425 A | 10/1998 | Mittendorf |
| 5,856,625 A | 1/1999 | Saunders et al. |
| 5,989,490 A | 11/1999 | Pinnow et al. |
| 6,057,045 A | 5/2000 | Wojcieszynski et al. |
| 6,059,085 A | 5/2000 | Farnsworth |
| 6,131,797 A | 10/2000 | Gasdaska et al. |
| 6,159,135 A | 12/2000 | Lonero et al. |
| 6,200,528 B1 | 3/2001 | Rodney et al. |
| 6,224,688 B1 * | 5/2001 | Takemura et al. .......... 148/318 |

FOREIGN PATENT DOCUMENTS

| | | |
|---|---|---|
| EP | 0105861 | 4/1984 |
| EP | 0903420 A2 | 3/1999 |
| JP | 10110720 | 4/1998 |
| JP | 2001062567 | 3/2001 |
| WO | WO 00/32828 | 6/2000 |
| WO | PCT/US02/36600 | 3/2003 |

* cited by examiner

*Primary Examiner*—David P. Bryant
*Assistant Examiner*—Stephen Kenny
(74) *Attorney, Agent, or Firm*—Ingrassia Fisher & Lorenz

(57) ABSTRACT

An improved stationary roller shaft of a gear assembly for an air turbine starter is provided. The air turbine starter may be used to start a gas turbine engine, such as may be found in aircraft, ships and military vehicles. The stationary roller shaft is formed of a material having a hardness of at least 66 Rockwell C and having a low inclusion content rating, thereby providing improved wear and/or fatigue properties.

17 Claims, 3 Drawing Sheets

STATIONARY ROLLER SHAFT FORMED OF A MATERIAL HAVING A LOW INCLUSION CONTENT AND HIGH HARDNESS

RELATED APPLICATIONS

This is a divisional of and claims priority from application Ser. No. 09/990,007 now issued U.S. Pat. No. 6,585,483 entitled "Stationary Roller Shaft Formed Of A Material Having A Low Inclusion Content And High Hardness", filed Nov. 20, 2001, which is incorporated herein by reference.

FIELD OF THE INVENTION

The present invention relates generally to stationary roller shafts for gear assemblies for gas turbine engines and more particularly to an improved stationary roller shaft used in an air turbine starter for gas turbine engines.

BACKGROUND OF THE INVENTION

An air turbine starter is a device used to start a gas turbine engine, such as an aircraft jet engine. The air turbine starter is mounted by the jet engine, much as a starter for an automobile is located by the automobile's engine. In order to start the jet engine, the air turbine starter is activated. The owner of the present invention, Honeywell International Inc., has for years successfully designed, developed and manufactured air turbine starters.

An air turbine starter may include a high speed gear assembly that converts air flow into the rotational energy needed to start a gas turbine engine. This high speed gear assembly includes gears supported by rolling elements that rotate around a stationary roller shaft at speeds of about 26,000 rpm or more. Although prior air turbine starter designs are very safe and reliable, these high rotational speeds cause substantial Hertzian stresses and frictional shear loads on certain areas of the stationary roller shaft, which may result in wearing and fatigue at those areas. For years, stationary roller shafts of air turbine starters have been made from steel materials. However, because such steel materials generally have a hardness of 62 Rockwell C or less, they are susceptible to surface spalling and fatigue. Fabricating the stationary roller shafts from harder materials does not necessarily provide satisfactory results, as harder materials may also be more brittle and, thus, more susceptible to cracking. In addition, stationary roller shafts formed from steel materials with relatively high inclusion contents make the shafts susceptible to sub-surface rolling contact fatigue.

Accordingly, there is a need for an air turbine starter with a stationary roller shaft formed of material that is capable of substantially withstanding wearing and fatigue from rolling elements that rotate at high rotational velocities. The present invention satisfies this need and provides related advantages.

SUMMARY OF THE DISCLOSURE

The present invention relates to a stationary roller shaft for an air turbine starter that is formed of a material that is capable of substantially withstanding wearing and fatigue from associated rolling elements that may rotate at high speeds.

In accordance with an exemplary embodiment of the present invention, and by way of example only, a stationary roller shaft of a gear assembly is provided. The gear assembly includes a plurality of rolling elements that contact a surface of the stationary roller shaft and are configured to rotate about the stationary roller shaft while the air turbine starter is in operation. The stationary roller shaft is formed of a material having a hardness of at least 66 Rockwell C and having a low inclusion content rating.

In accordance with another exemplary embodiment of the present invention, an air turbine starter is provided. The air turbine starter includes a housing defining an inlet, an outlet, and a flow path between the inlet and the outlet for conveying a flow of pressurized air therebetween. The air turbine starter also includes a turbine disposed in the flow path and which produces turbine shaft power. An output shaft transmits the shaft power externally of the air turbine starter. A gear train couples the turbine with the output shaft. The gear train comprises at least one stationary roller shaft that is formed of a material having hardness of at least 66 Rockwell C and having a low inclusion content rating.

In accordance with a further exemplary embodiment of the present invention, a gear assembly is provided. The gear assembly includes a stationary roller shaft and a plurality of rolling elements that are configured to rotate about the stationary roller shaft. The stationary roller shaft is formed of a material having a hardness of at least 66 Rockwell C and the material is produced by a process including vacuum induction melting, atomization, and hot isostatic compacting.

In accordance with yet another exemplary embodiment of the present invention, a method for fabricating a stationary roller shaft is provided. The method includes machining a stationary roller shaft from material produced by a process including vacuum induction melting, atomization, and hot isostatic compacting. The stationary roller shaft is tempered to a temperature in the range of about 500° C. to about 600° C. to achieve a hardness of at least 66 Rockwell C. The method further includes grinding the stationary roller shaft to a desired surface finish.

In accordance with yet a further exemplary embodiment of the present invention, a kit for installing a stationary roller shaft in a gear assembly is provided. The kit includes a stationary roller shaft and a plurality of rolling elements configured to rotate about the stationary roller shaft. The stationary roller shaft is formed of a material having a hardness of at least 66 Rockwell C and having a low inclusion content rating.

Other independent features and advantages of the preferred stationary roller shaft will become apparent from the following detailed description, taken in conjunction with the accompanying drawings which illustrate, by way of example, the principles of the invention.

BRIEF DESCRIPTION OF THE DRAWINGS

A detailed description of embodiments of the invention will be made with reference to the accompanying drawings, wherein like numerals designate corresponding parts in the several figures, and wherein.

Skilled artisans will appreciate that elements in the figures are illustrated for simplicity and clarity and have not necessarily been drawn to scale. For example, the dimensions of some of the elements of the figures may be exaggerated relative to other elements to help to improve understanding of embodiments of the present invention.

DETAILED DESCRIPTION OF THE INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
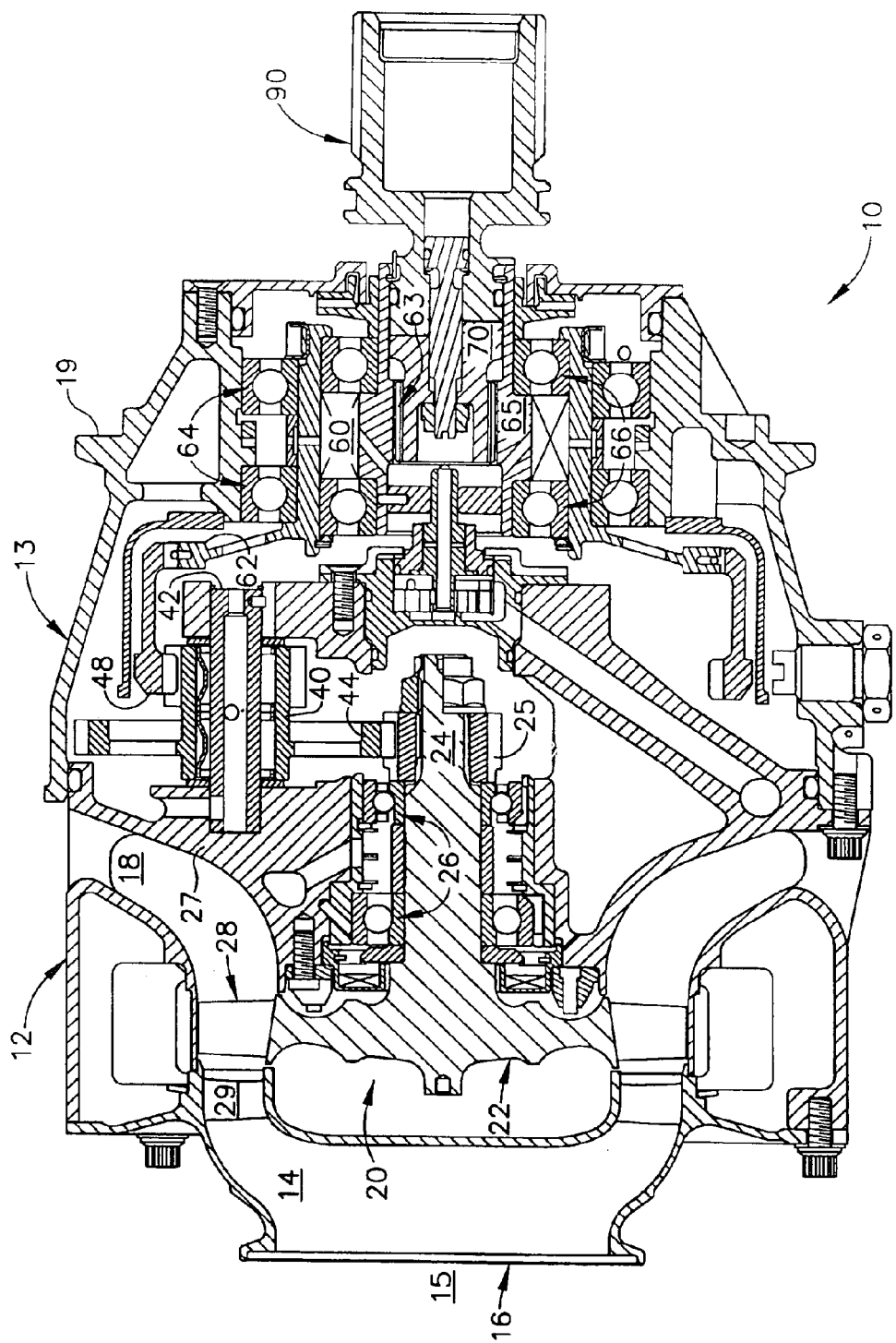
FIG. 1 illustrates, in cross-section, a Honeywell International, Inc. air turbine starter having the designation ATS 100-510.

Referring to the drawings, FIG. 1 shows an air turbine starter 10 embodying the present invention. The air turbine starter 10 has a first housing assembly 12 and a second housing assembly 13. The housing assembly 12 defines a flow path 14 extending from an inlet 16 to an outlet 18. The housing assembly 13 includes a mounting flange 19 for mounting the air turbine starter to a gas turbine engine, such as that, for example, in an aircraft, ship or armored vehicle (not shown). An air pressure duct 15 delivers pressurized air from an air supply to the inlet. Typically, the air pressure at the inlet 16 is in the range of 30–40 psig, but this may vary with the intended application.

Within the air turbine starter 10, the housing assemblies 12 and 13 support a turbine section 20, a compound planetary gear train 40, and an overrunning clutch 60. The turbine section 20 includes a turbine wheel 22 having a rotatable turbine shaft 24 extending therefrom, journaled by bearings 26 to a turbine exhaust housing 27, which is part of housing 12. A sun gear 25 is secured to the turbine shaft 24. A plurality of turbine blades 28 are circumferentially mounted to the turbine wheel 22 and are positioned within the flow path 14. Upstream of the blades 28 are a plurality of vanes 29 mounted to the housing assembly 12 which provide the proper flow angle to the air flow before it enters the turbine blades 28. In operation, pressurized air entering through inlet 16 is properly aligned by the vanes 29 and is then expanded across the blades 28 before exiting through outlet 18. The blades 28 convert the pressure energy of the air into rotary motion causing the turbine wheel 22, the turbine shaft 24 and the sun gear 25 to rotate at the same speed as the blades.

The compound planetary gear train 40 is comprised of one or more stationary roller shafts 42 each having a planet gear 44 that meshes with the sun gear 25. The planet gear 44 rotates about of the stationary roller shaft 42, and transmits power to a ring gear 48 and a hub gear 62, which is the input side of the overrunning clutch 60. In operation, the gear train 40 converts the high speed, low torque output of the turbine section 20 into low speed, high torque input for the clutch 60.

The clutch 60 may be a pawl and ratchet-type clutch, a roller-type clutch, a sprag-type clutch or any other clutch suitable for use in an air turbine starter. For convenience, FIG. 1 illustrates an air turbine starter having a sprag-type clutch. The clutch 60 has a spline 63 on its input side and a clutch drive shaft 70 on its output side. The hub gear 62 is supported by bearing elements 64. An inner race 65 of clutch 60 is supported by bearing elements 66. A portion of the drive shaft 70 extends beyond the housing 13 and has an air turbine starter output shaft 90 mounted thereon. The output shaft 90 can be coupled, for example, to a starter pad on the gearbox of a gas turbine engine, as is known in the industry (not shown).

Figure 2:
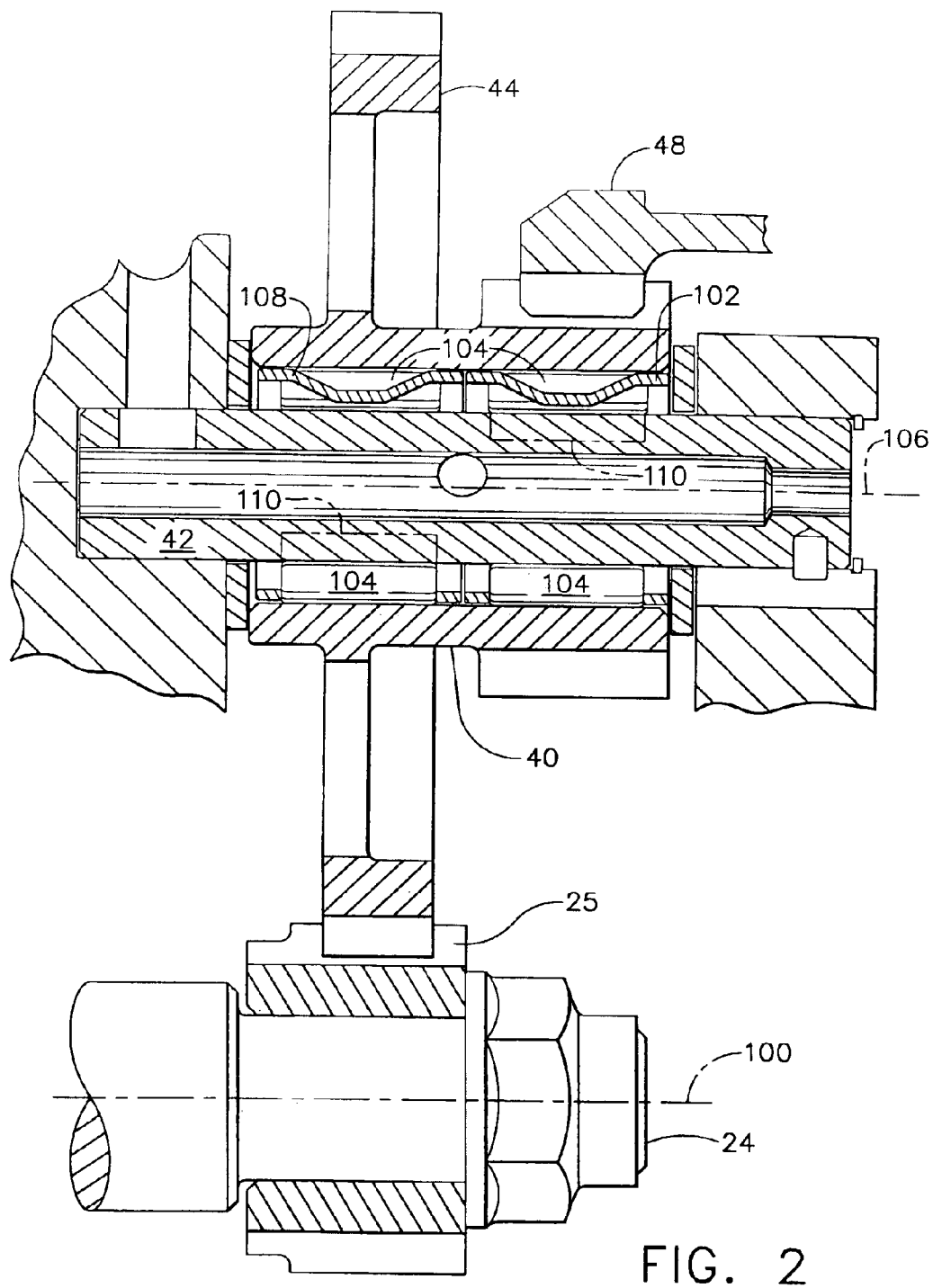
FIG. 2 is a cross-sectional view of a compound planetary gear train of the air turbine starter of FIG. 1.

FIG. 2 illustrates stationary roller shaft 42 of the compound planetary gear train 40 of air turbine starter 10 in more detail. Stationary roller shaft 42 is circumferentially surrounded by one or more cage assemblies 102. Cage assembly 102 includes cage 108 which is configured to support a plurality of rolling elements 104, such as a needle bearing, that contacts the surface of the stationary roller shaft 42 while rotating about its own axis. In the embodiment of FIG. 2, the rolling elements 104 are of a cylindrical shape. It will be appreciated, however, that the present invention contemplates the use of rolling elements of other shapes and configurations, such as spherical, frusto-conical and the like. The cage assembly 102 typically is formed from low carbon steel such as, for example, AISI 1010, 1018, 1020, 1025 and like materials, or AISI 4340 steel which is hardened to 30–34 Rockwell C and is subsequently silver plated. Rolling elements 104 are typically formed of steel such as AISI 52100, M50 and like materials.

In operation, as the turbine shaft 24 and sun gear 25 rotate about an axis 100 of turbine shaft 24, sun gear 25 causes planet gear 44 to rotate about an axis 106 of stationary roller shaft 42. As planet gear 44 rotates around stationary roller shaft 42, it causes rolling elements 104 to rotate about axis 106 while contacting stationary roller shaft 42. Typically, rolling elements 104 may rotate around stationary roller shaft 42 at speeds of up to 26,000 rpm, but may rotate at even higher speeds depending the configuration of the air turbine starter and on the conditions under which the air turbine starter is operating. At such high rotational velocities, bearing elements 104 subject stationary roller shaft 42 to Hertzian stress loads and frictional shear loads. Because of the engagement of planet gear 44 with sun gear 25 and with ring gear 48, stationary roller shaft 42 is subjected to significant loads at areas on the stationary roller shaft 42 that are illustrated as phantom load areas 110 in FIG. 2. Depending on the hardness and microcleanliness of the material from which stationary roller shaft 42 is formed, such loads may cause wearing, such as surface spalling and subsurface rolling contact fatigue, of stationary roller shaft 42 at load areas 110 resulting in a shorter lifespan of stationary roller shaft 42.

In accordance with one embodiment of the present invention, the stationary roller shaft 42 is fabricated from a material substantially resistant to wearing and fatigue from such loads. The inventor has found that a stationary roller shaft 42 fabricated from a material, such as a metal alloy, having a hardness of at least 66 Rockwell C and having a low inclusion content rating provides satisfactory resistance to surface spalling and subsurface rolling contact fatigue. Inclusions are stress risers or imperfections in the matrix of a material that may initiate subsurface cracking in the material. In this context, the term "inclusion content" shall have the meaning commonly used within the metallurgical and materials industries and as used by the American Society for Testing and Materials (ASTM) in its "Standard Test Methods for Determining the Inclusion Content of Steel," E45-97 (2000). A material having a low inclusion content suitable for fabrication of stationary roller shaft 42 will have a sufficiently low number of inclusions that stationary roller shaft 42 will not be readily susceptible to subsurface rolling contact fatigue. As used herein, the term "low inclusion content rating" shall be defined as a JK inclusion rating of the worst field of the material that does not exceed the limits set forth in Table I, where the maxi mum number of ratable fields in the material shall not exceed the limits specified in Table II:

TABLE I

| Inclusion Type | Thin | Heavy |
| --- | --- | --- |
| A | 1.5 | 1.0 |
| B | | |
| C | | |
| D | | |

TABLE II

| Inclusion Type | Thin | Heavy |
| --- | --- | --- |
| A | 8 | 1 |
| B | 3 | |
| C | 3 | |
| D | 5 | |

An example of a material suitable for use in fabricating stationary roller shaft 42 in accordance with an embodiment of the present invention includes a high speed steel that includes approximately, in weigh percent, from 1.30% to 1.40% carbon, and preferably 1.30% carbon, from 0.15% to 0.40% manganese and preferably 0.35% manganese, from 0.15% to 0.40% silicon and preferably 0.25% silicon, from 3.50% to 4.25% chromium and preferably 3.75% chromium, from 1.75% to 2.25% vanadium and preferably 2.00% vanadium, from 5.75% to 6.75% tungsten and preferably 6.25% tungsten, from 10.0% to 11.0% molybdenum and preferably 10.50% molybdenum, a maximum of about 0.04% sulfur and preferably 0.03% sulfur, a maximum of about 0.03% phosphorous, a minimum of about 0.035% nitrogen, and the balance iron. It will be appreciated that the upper and/or lower limits of the above ranges may be suitably increased or decreased as long as the material so formed has a hardness of 66 Rockwell C and a low inclusion content rating. Preferably, the material is produced by a particle metallurgy process that includes vacuum induction melting of raw materials, followed by atomization and subsequent consolidation to full density by hot isostatic compacting. Using this process, the material acquires uniform distribution and small size of primary constituents, such as carbides, that result in a low inclusion content which permits the material to withstand subsurface rolling contact fatigue even after repeated rotations of the rolling elements about the stationary roller shaft. It will be appreciated, however, that any other process suitable for attaining a low inclusion content may be used to produce the material. An example of material having the above-described composition and formed by the above-described process includes AISI M62 sold under the trademark CPM® VIM CRU 20® by Crucible Materials Corporation, Syracuse, N.Y. It will be appreciated, however, that any other suitable material having a hardness of at least Rockwell 66 C and a low inclusion content rating may be used to fabricate stationary roller shaft 42 so that wearing from frictional loads at load areas 110 may be reduced and so that the life of stationary roller shaft 42 may be desirably extended.

In a further exemplary embodiment of the present invention, the inventor has found that providing a surface finish of less than 8 microinches rms on a stationary roller shaft made of the above-described material contributes to the reduction of surface spalling. Preferably, the stationary roller shaft has a surface finish in the range of from about 4 to about 8 microinches rms.

A process for fabricating the stationary roller shaft 42 may include gross machining the stationary roller shaft 42 from the above-described material. The stationary roller shaft 42 may then be subjected to heat treatment under suitable conditions so that the material attains a hardness of at least 66 Rockwell C. Typically, the stationary roller shaft may be tempered to temperatures in the range of about 500° C. to about 600° C., preferably about 538° C., to achieve a hardness of 66 Rockwell C or higher. The stationary roller shaft 42 may then be finish ground to the desired surface diameters and subjected to suitable surface treatments to achieve a desired surface finish, preferably less than 8 microinches rms. The stationary roller shaft 42 also may be subjected to nitridation, steam tempering, and/or titanium nitride coating.

A stationary roller shaft 42 in accordance with an embodiment of the present invention has been tested to examine the operating life of a stationary roller shaft fabricated from the above described material. During testing, a stationary roller shaft 42 was fabricated from AISI M62, surface ground to have a surface finish of approximately 8 microinches rms, and assembled into a compound planetary gear train of an air turbine starter, such as illustrated in FIGS. 1 and 2. The air turbine starter was turned on and off repeatedly to examine the operating life of the stationary roller shaft. The tests revealed that the stationary roller shaft fabricated in accordance with the present invention could operate satisfactorily after 16,300 starts of the air turbine starter without significant spalling or micropitting. Companion tests on stationary roller shafts fabricated from known materials, such as high speed steel AISI M50, with hardness of 62 Rockwell C and with inclusion content ratings similar to the low inclusion content rating of AISI M62 demonstrated significant spalling and/or micropitting after only 4000 starts of the air turbine starter. While the above testing indicates that a stationary roller shaft fabricated in accordance with the present invention could operate satisfactorily after 16,300 starts of the air turbine starter, it will be appreciated that this merely reflects the particular experimental conditions and is not essential to the present invention.

Figure 3:
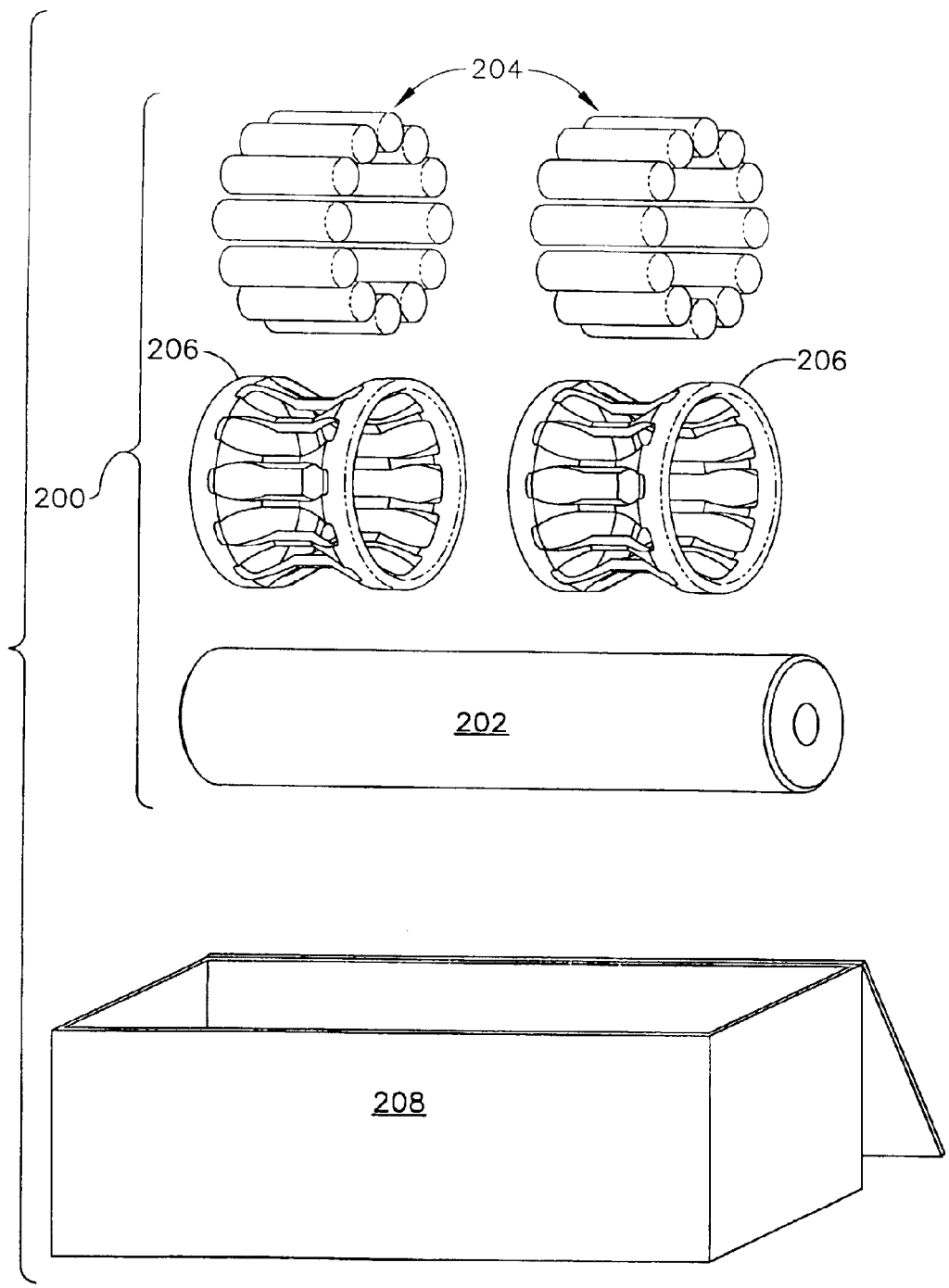
FIG. 3 is an exploded view of a kit and packaging for a kit that can be used to provide an air turbine starter in accordance with an embodiment of the present invention.

In a further aspect of one embodiment of the present invention, conventional air turbine starters can be rebuilt, and new air turbine starters can be built, incorporating one or more aspects of the present inventions, such as the stationary roller shaft described herein, using a kit 200 as illustrated in FIG. 3. In a preferred embodiment, the kit may include one or more stationary roller shafts 202 fabricated from a material having a hardness of at least 66 Rockwell C and having a low inclusion content rating. The kit may also have other components of the compound planetary gear train as determined by the particular design of the air turbine starter. For example, the kit may also include a suitable number of rolling elements 204, which may take a number of suitable shapes. The kit may also include a suitable number of cages 206 that are configured to rotate about stationary roller shaft 202 and to support rolling elements 204. The kit may also include any other components or accessories necessary to reliably install the stationary roller shaft. The kit may include an appropriate container 208 for shipping, storage or other purposes.

Thus, as seen from the foregoing description, the present invention provides a stationary roller shaft that is fabricated from a material having a hardness of at least 66 Rockwell C and having a low inclusion content rating such that the stationary roller shaft is able to resist surface wearing and subsurface rolling contact fatigue even after multiple rotations of rolling elements around the stationary roller shaft.

While the above described stationary roller shaft of the present inventions has been described with reference to an embodiment of a compound planetary gear train of an air turbine starter, it will be appreciated that the stationary roller shaft may be utilized in various other embodiments of compound planetary gear trains of air turbine starters. The present inventions also can be used with other air turbine engine configurations.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to any particular embodiment disclosed for carrying out this invention, but that the invention includes all embodiments falling within the scope of the appended claims.

I claim:

1. A method for fabricating a stationary roller shaft for a turbine starter, the method comprising:
    obtaining a predetermined material having a low inclusion content wherein the predetermined material consists essentially of in, weight percent, form 1.30% to 1.40% carbon, from 0.15% to 0.40% manganese, from 0.15% to 0.40% silicon, from 3.50% to 4.25% chromium, from 1.75% to 2.25% vanadium, from 5.75% to 6.75% tungsten, from 10.0% to 11.0% molybdenum, a maximum of approximately 0.04% sulfur, a maximum of approximately 0.03% phosphorous, a minimum of approximately 0.035% nitrogen, and the balance iron;
    machining the stationary roller shaft from the material such that the shaft is homogenous with respect to the predetermined material; and
    treating the stationary roller shaft to achieve a hardness of at least 66 Rockwell C.

2. The method of claim 1, wherein the material is a high speed steel.

3. The method of claim 1, wherein the material consists essentially of, in weigh percent, 1.30% carbon, 0.35% manganese, 0.25% silicon, 3.75% chromium, 2.00% vanadium, 6.25% tungsten, 10.50% molybdenum, and 0.03% sulfur, a maximum of approximately 0.03% phosphorous, a minimum of approximately 0.035% nitrogen, and the balance iron.

4. The method of claim 1, wherein the material comprises AISI M62.

5. The method of claim 1, further comprising grinding the stationary roller shaft to a desired surface finish.

6. The method of claim 5, wherein the grinding comprises grinding the stationary roller shaft to a surface finish no greater than 8 microinches rms.

7. The method of claim 1, wherein the material is produced by a process including vacuum induction melting, atomization and hot isostatic compacting.

8. The method of claim 1, wherein the treating comprises heating the stationary roller shaft to a temperature in the range of from about 500° C. to about 600° C.

9. A method for fabricating a stationary roller shaft for an air turbine starter, the method comprising:
    obtaining a predetermined material produced by a process resulting in a low inclusion content of the material wherein the predetermined material consists essentially of, in weight percent, from 1.30% to 1.40% carbon, from 0.15% to 0.40% manganese, from 0.15% to 0.40% silicon, from 3.50% to 4.25% chromium, from 1.75% to 2.25% vanadium, from 5.75% to 6.75% tungsten, from 10.0% to 11.0% molybdenum, a maximum of approximately 0.04% sulfur, a maximum of approximately 0.03% phosphorous, a maximum of approximately 0.035% nitrogen, and the balance iron;
    machining the stationary roller shaft from the material such that the roller shaft is homogenous with respect to the predetermined material; and
    treating the stationary roller shaft to achieve a hardness of at least 66 Rockwell C by heating the stationary roller shaft to a temperature in the range of from about 500° C. to about 600° C.

10. The method of claim 9, wherein the material is a high speed steel.

11. The method of claim 9, wherein the material consists essentially of, in weigh percent, 1.30% carbon, 0.35% manganese, 0.25% silicon, 3.75% chromium, 2.00% vanadium, 6.25% tungsten, 10.50% molybdenum, and 0.03% sulfur, a maximum of approximately 0.03% phosphorous, a minimum of approximately 0.035% nitrogen, and the balance iron.

12. The method of claim 9, wherein the material comprises AISI M62.

13. The method of claim 9, further comprising grinding the stationary roller shaft to a desired surface finish.

14. The method of claim 13, wherein the grinding comprises grinding the stationary roller shaft to a surface finish no greater than 8 microinches rms.

15. The method of claim 9, wherein the material is produced by a process including vacuum induction melting, atomization and hot isostatic compacting.

16. A method for fabricating a stationary roller shaft for an air turbine starter having a cavity of a predetermined size for accepting the roller shaft, the method comprising:
    obtaining a predetermined material produced by a process resulting in a low inclusion content of the material, wherein the predetermined material consists essentially of, in weight percent, from 1.30% to 1.40% carbon, from 0.15% to 0.40% manganese, from 0.15% to 0.40% silicon, from 3.50% to 4.25% chromium, from 1.75% to 2.25% vanadium, from 5.75% to 6.75% tungsten, from 10.0% to 11.0% molybdenum, a maximum of approximately 0.04% sulfur, a maximum of approximately 0.03% phosphorous, a minimum of approximately 0.035% nitrogen, and the balance iron;
    machining the stationary roller shaft from the material so it is of a size generally appropriate to fit in the cavity and such that the stationary roller shaft is homogenous with respect to the predetermined material;
    treating the stationary roller shaft to achieve to achieve a hardness of at least 66 Rockwell C by heating the stationary roller shaft to a temperature in the range of from about 500° C. to about 600° C.; and
    grinding the stationary roller shaft to a desired surface finish.

17. The method of claim 16, wherein the material consists essentially of, in weight percent, 1.30% carbon, 0.35% manganese, 0.25% silicon, 3.75% chromium, 2.00% vanadium, 6.25% tungsten, 10.50% molybdenum, and 0.03% sulfur, a maximum of approximately 0.03% phosphorous, a minimum of approximately 0.035% nitrogen, and the balance iron.

* * * * *

UNITED STATES PATENT AND TRADEMARK OFFICE
CERTIFICATE OF CORRECTION

PATENT NO. : 6,892,455 B1
DATED : May 17, 2005
INVENTOR(S) : Robert H. Feest

It is certified that error appears in the above-identified patent and that said Letters Patent is hereby corrected as shown below:

Column 8,
Line 6, change "maximum" to -- minimum --.

Signed and Sealed this

Twenty-seventh Day of September, 2005

JON W. DUDAS
*Director of the United States Patent and Trademark Office*